(No Model.)
W. T. SMALLWOOD.
CHURN.
No. 520,087. Patented May 22, 1894.
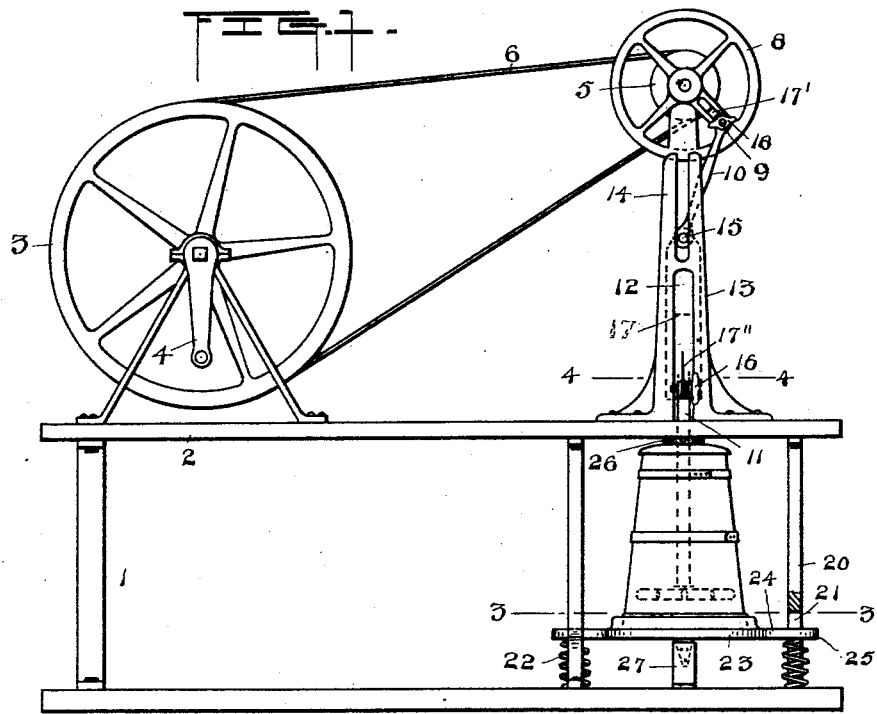
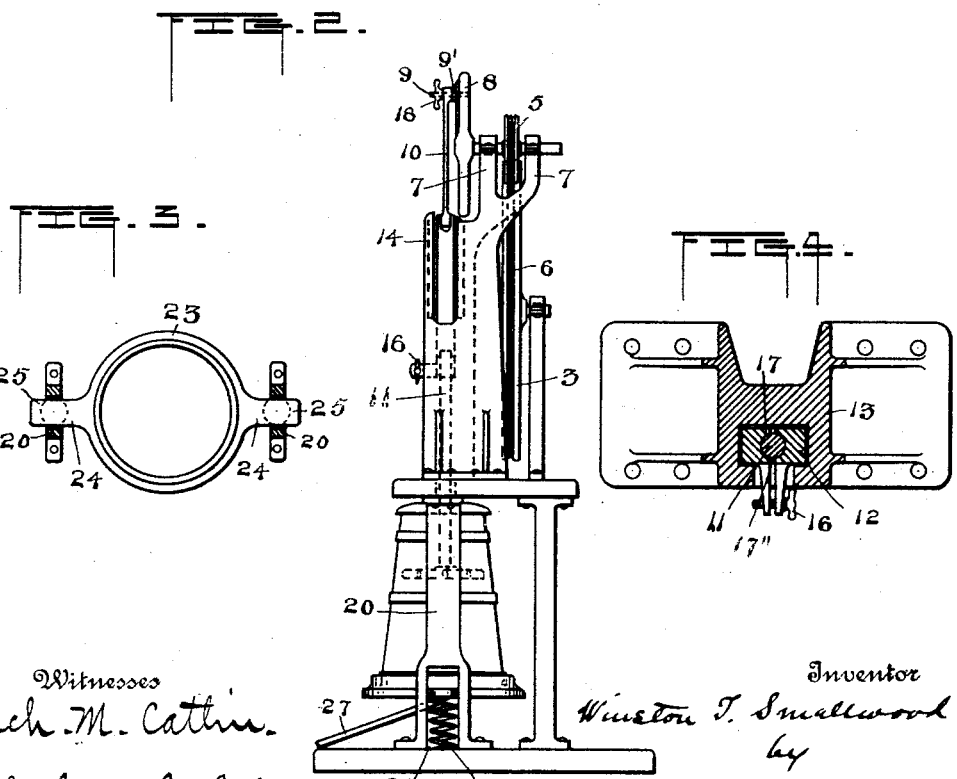
Witnesses
Arch. M. Catlin.
John C. Clark
Inventor
Winston T. Smallwood
by
Benj. R. Catlin Attorney

UNITED STATES PATENT OFFICE.

WINSTON T. SMALLWOOD, OF NEW ALBANY, MISSISSIPPI.

CHURN.

SPECIFICATION forming part of Letters Patent No. 520,087, dated May 22, 1894.

Application filed January 2, 1894. Serial No. 495,415. (No model.)

*To all whom it may concern:*

Be it known that I, WINSTON T. SMALLWOOD, a resident of New Albany, in the county of Union and State of Mississippi, have invented certain new and useful Improvements in Churns; and I do hereby declare the following to be a full, clear, and exact description of the invention, such as will enable others skilled in the art to which it pertains to make and use the same.

The invention relates to churns and mechanism for churning, comprising driving and crank wheels and churn-supporting devices; and it has for its objects to support the churn in a secure but yielding manner and to provide both for adjusting the length of the stroke of the dasher and for separately adjusting its situation in the churn independently of the length of the stroke; and it consists in the construction hereinafter described and particularly pointed out.

In the accompanying drawings; Figure 1 is a side elevation. Fig. 2 is an end elevation. Fig. 3 is a section on line 3—3 of Fig. 1, and Fig. 4 is a section on line 4—4 of Fig. 1.

Numeral 1 denotes a frame or table suitably supported on legs or otherwise and 2 a table or bench top.

3 indicates a driving pulley and 4 a driving crank attached to the same. 5 indicates a smaller pulley and 6 a driving cord or band. The shaft of said pulley 5 has bearings in posts 7 and upon one end outside of said post has fixed thereon a crank wheel 8. It may also be provided with a fly wheel on its opposite end. A crank or wrist pin is denoted by 9, a connecting rod by 10 and a churn dasher rod by 11 and a socketed holder and movable guide or block adapted to adjustably receive said dasher rod is indicated by 12, and guide ways for the same are denoted by 13.

14 denote guide ways extended above ways 13 adapted to receive between them and guide a pin 15 fixed in the movable block 12 by which said block is also laterally guided as it moves above the top of the guide ways 13. The ways 14 are formed by transverse slots in the upper part of the perforated stand having an enlarged base whereby it is bolted to a table or like support. Each end of the pin which joins rod 10 and block 12 plays in one or the other of these slots. The parts 7 extend upwardly near the side of the stand in manner to support wheel 8 over it and so that the connecting rod 10 works in a plane passing through the central line of the stand and of the churn and directly over the same the whole construction being simple, durable and specially adapted to drive the dasher and dasher rod in a true line without unnecessary friction and without undue strain of either the connecting rod or the dasher rod.

16 denotes a set screw or other like device for adjustably securing the dasher rod in block 12 the latter being suitably bored out at 17 to receive the rod and provided with a slit 17″ situated between two arms adapted to receive a set screw 16 for tightening the split block on the dasher rod. These arms are situated in a slot extending from the hole in the stand through one side thereof and are joined to the block one on each side of said slit 17″ and they project in front of the stand where they are easily accessible and receive a tightening screw. The purpose of this device is to provide for conveniently manipulating the parts to hold the rod and dasher at any desired region of the churn independently of means to vary the length of the dasher stroke.

Means for varying the length of a stroke consist preferably of a slotted spoke 17′ combined with the adjustable crank pin 9 and with a thumb nut 18 for clamping the parts in any desired situation. Said pin is provided with a fixed collar 9′ adapted to bear on the spoke or on the wheel in case it is made entire. The pin 9 has a screw threaded extension which receives the thumb nut 18. By these devices the upper end of the connecting rod can be quickly moved to or from the center of the wheel to vary the length of the stroke it being only necessary to loosen the nut, suitably slip the pin in the slot and then tighten the nut.

It is desirable to operate the churn dasher at different elevations according to the quantity and condition of the contents of the churn and it is also desirable to vary its length of stroke under changed conditions. Thus an adjustment for a full churn may not be suitable for one partially filled and in either case it is sometimes important that a very small stroke be given by the dasher particularly when it is liable to be obstructed by solid lumps of butter just at or before the completion of the churning process. In case the churn contains but a small amount of cream and all therefore near its bottom the dasher rod can be adjusted by set screw 16 so that the dasher will be situated in or near the cream before beginning to churn and then its stroke can be limited to or approximately to the depth of the cream by means of the thumb nut 18 and movable crank pin 9. In case separation of butter has begun or is about to begin and the operator has reason to fear that the agglomerating particles of butter will resist the passage of the dasher more than is desirable, or on the other hand in case he desires to gather the butter particles when they are in a comparatively soft or divided state he can place the dasher either above or below the main body of the cream and then by suitable regulation of the dasher strokes continue churning without forcing the dasher through the mass of butter to the possible injury of the churn in the former case, or with the effect to keep the butter in a too scattered and comminuted state in the latter case.

I am aware that other means for adjusting the length of the dasher stroke have been used and I do not broadly claim such devices. It is characteristic of my improvement that these adjustments are effected by the particular means described requiring the least possible time and no removing of parts liable to be lost, and further that these devices are combined with others next to be described which are intended to securely hold the churn but in a yielding manner to obviate the injurious effect of a sudden increase in the consistency of the contents of the churn or of a part of it, an unnecessarily heavy construction being otherwise required to insure the same durability of mechanism.

20 denotes posts secured to the table or bench top and provided with slots 21 extending through them and centrally enlarged to receive coiled springs 22.

23 indicates a churn-supporting disk provided with arms 24 extending through the slotted posts and having flattened treads 25 adapted to receive either a foot or a weight. The springs normally hold the arms and disks at or near the top of the slots and are made sufficiently strong to resist any ordinary blow of a churn dasher acting through the cream in the churn seated on the disk. The latter is provided with a depressed seat having its lateral annular wall preferably flared outwardly and upwardly to receive the foot of the churn. The latter is of such length that when placed on the disk, after the latter is depressed for the purpose, it will be borne up when the disk is released and have its cover, or the textile packing thereon, pressed against the bottom of the table 2 by the springs.

26 denotes textile washers or wipers surrounding the dasher rod over the cover and closely fitting it and held in place by the action of the springs.

To depress the disk for the insertion of the churn the foot may be placed upon a tread 25 or both of these may be used to move the disk down. But preferably a treadle 27 hinged or pivoted to the bottom of the disk 23 and adapted to depress said disk by foot pressure is employed. The disk being forced down the filled churn is conveniently placed thereon and will be lifted by the spring when the foot or other pressure is removed so that its textile covered top will be forced against the bottom of the table top.

I am aware that cans have been supported by springs against the pressure of filling devices and also that dasher rods have been made adjustable and provided with stationary guides and that means have been provided for adjusting both the length of the stroke of the dasher and its situation in the churn and such devices broadly are not of my invention. Neither are springs combined with cams and a treadle in can filling devices of my invention. I provide a stand of special construction adapted to receive a guiding block and clamping arms of particular form and having posts to furnish bearings for a shaft having a pulley and wheel and to support the latter close to the plane of the dasher rod, said block and stand serving to relieve the dasher rod from all lateral strains. I also provide for wiping the dasher rod and for retaining cream within the churn body and utilize the churn supporting springs to hold the fibrous cover and wiper securely in place, and I further provide a supporting disk with guiding arms and a seat for the churn body to prevent any lateral displacement of the latter.

Having thus described my improvement, what I claim is—

In a churn the guiding stand having bracket posts 7 and a centrally perforated base adapted to be bolted to a table, said stand being provided with ways 14 at its upper part to guide a transversely disposed pin 15 and with a longitudinal hole 17 angular in cross section and continuous at its lower part with a slot extending through one side of said stand, whereby guides 13 are formed for a split, perforated block 12 having clamping arms extending out through the slot, and said split block and arms, in combination with a perforated table, a churn body, a supporting disk having a churn body seat and guiding arms, a dasher rod, a screw to clamp said arms and block upon the rod accessible in front of the stand, a connecting rod 10, the wheel 8 supported to turn in said posts 7 near the axis of the stand and of the churn body, a fibrous cover 26 closely surrounding the dasher rod, a spring to support the churn body and press the fabric against the bottom of the table whereby the rod is wiped and the escape of cream is prevented and devices for depressing the churn body, substantially as set forth.

In testimony whereof I have signed this specification in the presence of two subscribing witnesses.

WINSTON T. SMALLWOOD.

Witnesses:
  H. MARSHALL,
  K. OWEN.